United States Patent
Hsu

(10) Patent No.: US 6,571,688 B1
(45) Date of Patent: Jun. 3, 2003

(54) TOASTER STRUCTURE

(75) Inventor: Tony Hsu, Yung Kang (TW)

(73) Assignee: Lundar Electric Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 10/274,141

(22) Filed: Oct. 21, 2002

(51) Int. Cl.[7] .......................... A47J 37/04; A47J 37/08; A21B 3/02
(52) U.S. Cl. .............................. 99/337; 99/385; 99/389; 99/391; 99/393; 219/405; 219/413; 219/521
(58) Field of Search .................... 99/326–333, 337, 99/338, 339, 340, 385–389, 390–393, 443 R, 443 C, 444–450, 467; 219/412–414, 398, 386, 403–405, 489, 408, 492, 494, 519–521, 390–392, 396, 400, 401; 126/335, 19 M, 214 A; 337/343, 349, 365, 368; 312/236, 312; 426/510, 523

(56) References Cited

U.S. PATENT DOCUMENTS

| | | | | |
|---|---|---|---|---|
| 3,660,637 A | * | 5/1972 | Grove | 219/413 |
| 3,684,860 A | * | 8/1972 | Snyder | 99/393 X |
| 3,693,538 A | * | 9/1972 | Synder | 99/447 |
| 3,752,955 A | * | 8/1973 | Grove | 99/389 X |
| 3,845,272 A | * | 10/1974 | Schultz et al. | 99/393 X |
| 3,859,903 A | * | 1/1975 | Kipp | 99/391 |
| 4,065,658 A | * | 12/1977 | Keim | 99/389 X |
| 4,254,325 A | * | 3/1981 | Snyder | 99/329 R |
| 4,382,175 A | * | 5/1983 | Huggler | 99/329 R |
| 4,413,173 A | * | 11/1983 | Grove et al. | 99/332 X |
| 4,476,848 A | * | 10/1984 | Protas | 99/340 X |
| 5,680,810 A | * | 10/1997 | Sham | 99/339 X |
| 6,100,502 A | * | 8/2000 | Sham et al. | 99/467 X |

* cited by examiner

Primary Examiner—Timothy F. Simone
(74) Attorney, Agent, or Firm—Rosenberg, Klein & Lee

(57) ABSTRACT

A toaster structure comprises a rear plate, a rear door, and a safety switch. The rear plate has an opening at center portion with a pair of rails formed at respective sides of the opening, and a step below the lower end of the opening. The rear door comprises a pair of edges at respective sides, which align with the rails of the rear plate and will guide the rear door to slide along the rails up and down, whereas the step will receive the rear door and confine further movement. The safety switch is formed on the rear plate in align with one side of the step, and will be pressed by the rear door when the door is closed.

2 Claims, 3 Drawing Sheets

TOASTER STRUCTURE

FIELD OF THE INVENTION

This invention relates to a toaster, more particularly to a toaster with a rear door for cleaning and a safety switch to assure the rear door is closed firmly.

1. BACKGROUND OF THE INVENTION

Modern families for their convenience use a toaster widely, but it is hard to clean inside due to its fixed design. It also consumes time to install after cleaning.

In view of this, the inventor has derived a toaster which comprises an opening at the rear end for easy to clean.

2. SUMMARY OF THE INVENTION

It is the primary object of the present invention to provide a toaster structure, which is easy to mount and to dismount.

It, is another object of the present invention to provide a toaster structure, which is easy to clean.

It is another object of the present invention to provide a toaster structure, which is inexpensive in manufacture.

DETAILED DESCRIPTION OF THE PREFERRED EMBODIMENTS

Figure 1:
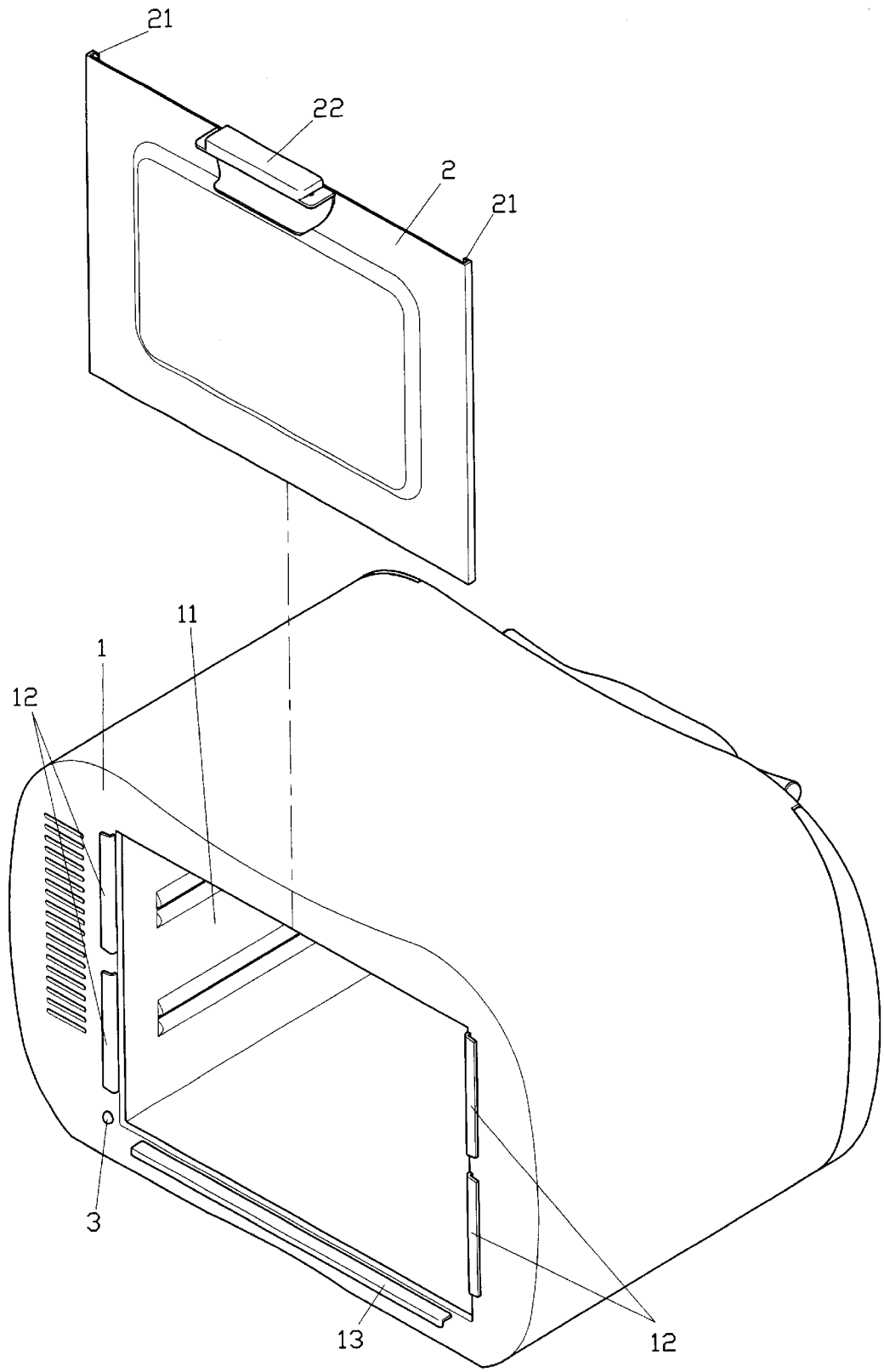
FIG. 1 is an exploded view of the present invention.

The toaster of the present invention comprises a rear plate 1, a rear door 2, and a safety switch 3, as shown in FIG. 1.

The rear plate 1 of the toaster has an opening 11 at the center portion with a pair of rails 12 formed on respective sides of the opening 11, and a step 13 below the lower end of the opening 11. Each of the rails 12 has two sections, and the rear door 2 has a pair of edges 21 on respective sides adapted for the rear door 2 to slide along the rails 12. The downward sliding movement of the rear door 2 will be stopped when the rear door 2 has reached to the step 13. The rear door 2 comprises a handle 22 on one upper side for easy to operate. The safety switch 3 is formed on the rear plate 1 in align with one side of the step 13.

Figure 2:
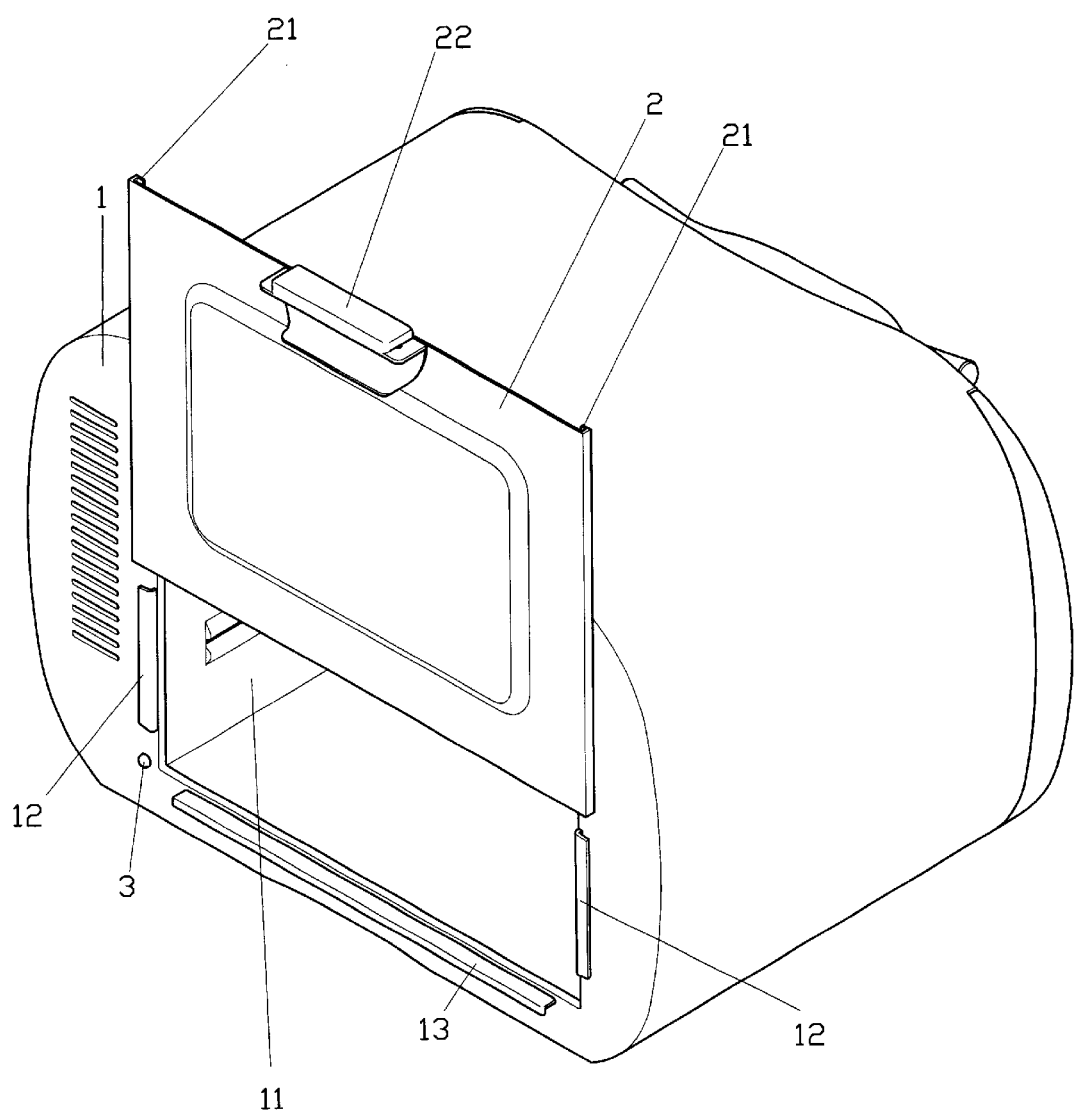
FIG. 2 is a perspective view of the present invention.
Figure 3:
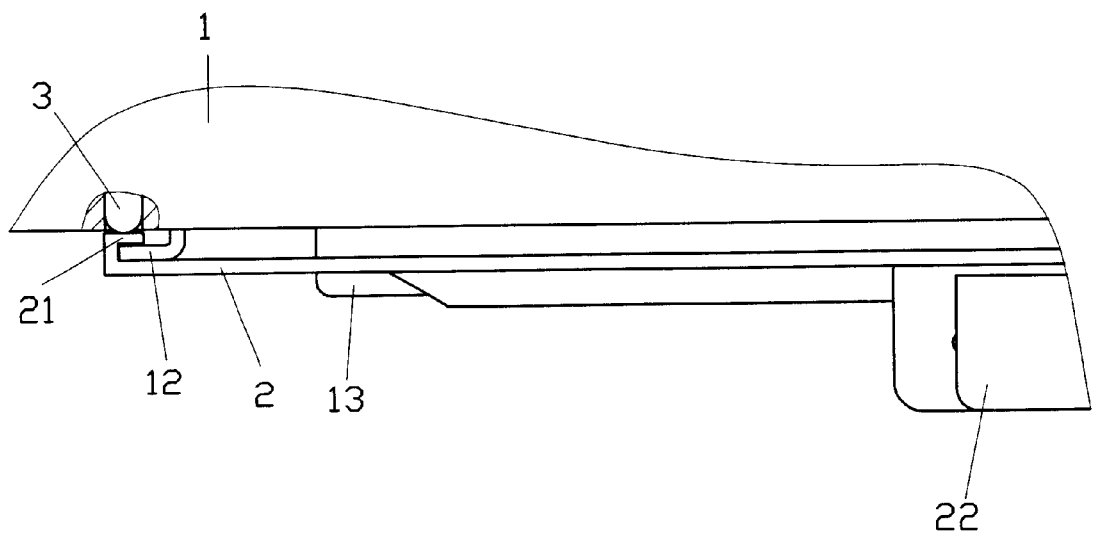
FIG. 3 is a partial cross-sectional view of the present invention.

FIG. 2 illustrates operation of the toaster of the present invention. The rear door 2 is engaged with the rear plate 1 when seating on the step 13. When the rear door 2 slides to the bottom of the opening 11 and seats on the step 13, the safety switch 13 is pressed by the rear door 2, hence electricity is connected, as shown in FIG. 3. When the rear door 2 is slid upward away from the rails 12 and the safety switch 13 is not pressed, thus electricity is in open circuit. Therefore, the product is safe to clean.

I claim:

1. A toaster structure comprising a rear plate, a rear door and a safety switch, wherein said rear plate having an opening at center portion thereof with a pair of rails on respective sides of said opening, and a step below a lower end of said opening, said rear door comprising a pair of edges at respective sides corresponding to said rails of said rear plate, said safety switch being formed on said rear plate in align with one side of said step.

2. The toaster structure, as recited in claim 1, wherein said rear door comprises a handle on one upper side thereof.

* * * * *